(12) United States Patent
Park et al.

(10) Patent No.: US 12,055,734 B2
(45) Date of Patent: Aug. 6, 2024

(54) LENS DEVICE AND ASSEMBLY (71) Applicant: SAMSUNG ELECTRO-MECHANICS CO., LTD., Suwon-si (KR)

(72) Inventors: Seong Chan Park, Suwon-si (KR); Hae Sung Oh, Suwon-si (KR); Sang A Kim, Suwon-si (KR); Ae Rim Kim, Suwon-si (KR); Sang Hyun Kwon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 464 days.

(21) Appl. No.: 17/579,993

(22) Filed: Jan. 20, 2022

(65) Prior Publication Data
US 2023/0055901 A1 Feb. 23, 2023

(30) Foreign Application Priority Data
Aug. 20, 2021 (KR) .................. 10-2021-0110350

(51) Int. Cl.
*G02B 5/00* (2006.01)
*G02B 1/04* (2006.01)
*G02B 7/02* (2021.01)

(52) U.S. Cl.
CPC ............. *G02B 5/003* (2013.01); *G02B 1/041* (2013.01); *G02B 7/021* (2013.01)

(58) Field of Classification Search
None
See application file for complete search history.

(56) References Cited

U.S. PATENT DOCUMENTS

| | | | |
|---|---|---|---|
| 2016/0011415 A1 | 1/2016 | Takada | |
| 2016/0040031 A1* | 2/2016 | Kubota | G02B 5/003 |
| | | | 252/582 |
| 2016/0178805 A1* | 6/2016 | Kang | G02B 7/022 |
| | | | 427/162 |
| 2019/0064399 A1 | 2/2019 | Wang et al. | |

(Continued)

FOREIGN PATENT DOCUMENTS

| | | |
|---|---|---|
| CN | 105717604 A | 6/2016 |
| CN | 107450113 A | 12/2017 |

(Continued)

OTHER PUBLICATIONS

Korean Office Action issued on Jun. 7, 2023, in counterpart Korean Patent Application No. 10-2021-0110350 (7 pages in English, 6 pages in Korean).

(Continued)

*Primary Examiner* — Bao-Luan Q Le
*Assistant Examiner* — Danell L Owens
(74) *Attorney, Agent, or Firm* — NSIP Law (57) ABSTRACT

A lens device includes a lens including an optical unit, and a rib portion extending outwardly of the optical unit in a radial direction, where the rib portion includes a light transmission region and a light blocking region, and where the light blocking region is disposed inside of the rib portion. The light blocking region may include a non-polar colorant. The lens may include a cyclic olefin compound. The lens device may include one or more lenses with rib portions with light transmission regions and light blocking regions, and may be a lens assembly with the one or more lenses.

20 Claims, 4 Drawing Sheets

(56) References Cited

U.S. PATENT DOCUMENTS

2019/0302332 A1    10/2019   Lee et al.
2020/0233176 A1    7/2020   Feng et al.
2022/0155549 A1    5/2022   Lai et al.

FOREIGN PATENT DOCUMENTS

| | | |
|---|---|---|
| CN | 112596186 A | 4/2021 |
| JP | 2014-019839 A | 2/2014 |
| JP | 2014-115393 A | 6/2014 |
| JP | 2014-215589 A | 11/2014 |
| JP | 2014-238527 A | 12/2014 |
| KR | 10-1003636 B1 | 12/2010 |
| KR | 10-1060915 B1 | 8/2011 |
| KR | 10-2016-0075085 A | 6/2016 |
| KR | 10-2018-0105696 A | 9/2018 |
| KR | 10-2018-0132014 A | 12/2018 |
| KR | 10-2019-0113062 A | 10/2019 |
| TW | I725928 B | 4/2021 |
| WO | WO 2014/156915 A1 | 10/2014 |

OTHER PUBLICATIONS

Taiwanese Office Action issued on Jan. 12, 2024, in counterpart Taiwanese Patent Application No. 111102164 (9 pages in English, 6 pages in Chinese).

\* cited by examiner

LENS DEVICE AND ASSEMBLY

CROSS-REFERENCE TO RELATED APPLICATION

This application claims the benefit under 35 USC 119(a) of Korean Patent Application No. 10-2021-0110350 filed on Aug. 20, 2021 in the Korean Intellectual Property Office, the entire disclosure of which is incorporated herein by reference for all purposes.

BACKGROUND

1. Field

The following description relates to a lens device and assembly.

2. Description of Related Art

When strong or intense light, e.g., in a darkroom or under fluorescent light, is incident on a lens included in a camera module, for example, at a certain angle, a problem may occur in which light at specific angles may cause internal reflection(s) from rib surface(s) of the lens. Such internal reflection may not be desired for accurate image formation as the internal reflection may cause flares or ghosting in the image, as captured.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a lens device includes a lens that has an optical unit, and a rib portion extending outwardly of the optical unit in a radial direction, wherein the rib portion includes a light transmission region and a light blocking region, and wherein the light blocking region may be disposed inside of the rib portion and includes a non-polar colorant.

The light blocking region may extend inside the rib portion from one surface of the rib portion in an optical axis direction.

The light blocking region may extend inside the rib portion from both surfaces of the rib portion in an optical axis direction.

The light blocking region may extend inside the rib portion from a surface of the rib portion toward an optical axis of the lens.

The light blocking region may be disposed inside the rib portion at at least one surface of the rib portion.

An average thickness of the light blocking region in an optical axis direction may be 15 µm or less.

The light blocking region may have an average transmittance of 20% or less for light having a wavelength of 400 nm to 650 nm.

The light blocking region may include an alkane having 1 to 16 carbon atoms.

The colorant may be a light blocking dye, and a concentration of the light blocking dye may decrease as a distance from a surface of the rib portion increases toward the light transmission region.

At least the rib portion of the lens may include a cyclic olefin compound.

The lens device may further include another lens adjacent to the lens, where the other lens may include another optical unit and another rib portion extending outwardly of the other optical unit in a corresponding radial direction, where the other rib portion may include another light transmission region.

The other rib portion may include another light blocking region that includes another non-polar colorant, where the other light blocking region may be disposed inside of the other rib portion, and where the colorant is same or different from the other colorant.

The light blocking region may include an entire outer circumference edge of the lens and/or the other light blocking region may include an entire outer circumference edge of the other lens.

The lens device may be a lens assembly and may further include a lens barrel including the lens and the other lens.

The light blocking region may be adjacent to the other light blocking region.

In one general aspect, a lens includes an optical unit and a rib portion extending outwardly of the optical unit in a radial direction, where the optical unit and the rib portion includes a cyclic olefin compound, the rib portion includes a light transmission region and a light blocking region, and the light blocking region is disposed inside of the rib portion and includes a non-polar colorant for reducing light transmissivity.

In one general aspect, a lens device includes a lens assembly, having a lens barrel including an internal space, and one or more lenses stacked in the internal space of the lens barrel along an optical axis, where each of the one or more lenses include a respective optical unit and a respective rib portion extending outwardly of the respective optical unit in respective radial directions of the stacked one or more lenses, where one or more of the respective rib portions includes a respective light transmission region and a respective light blocking region, and where the respective light blocking regions are disposed inside of the one or more respective rib portions and each may include respective non-polar colorants.

A corresponding light blocking region, of the respective light blocking regions of the one or more respective rib portions, of at least one of the one or more lenses may extend inside a corresponding rib portion from one surface or both surfaces of the corresponding rib portion in an optical axis direction.

A corresponding light blocking region, of the respective light blocking regions of the one or more respective rib portions, of at least one of the one or more lenses may extend inside a corresponding rib portion from a radially outward surface of the corresponding rib portion toward an optical axis of the at least one lens.

A corresponding light blocking region, of the respective light blocking regions of the one or more respective rib portions, of at least one of the one or more lenses may be disposed inside a corresponding rib portion at at least one surface of the corresponding rib portion.

Other features and aspects will be apparent from the following detailed description, the drawings, and the claims.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

For explanatory purposes, some elements, components, or features may be omitted from discussion in some embodiments, but the omission of such elements, components, or features is not intended to mean that such embodiments may not include any or all of such elements, components, of features. Likewise, for such explanatory purposes, and as a non-limiting example, a thickness, for example, of such elements, component, or features may be illustrated with an enlarged or expanded form or shape to focus an explanation on various layers and regions, but embodiments are not limited thereto. For example, as noted above, the drawings may not be to scale, and the relative size, proportions, and depiction of elements in the drawings may be exaggerated for clarity, illustration, and convenience. In addition, components having a same or like function within a scope of a same or like idea may also be referred to as the same, though embodiments are not limited thereto.

The articles "a," "an," and "the" are intended to include the plural forms as well, unless the context clearly indicates otherwise. In addition, the terminology used herein is for describing various examples, and is not to be used to limit the disclosure. The expressions "has"/"have" or "may have", "includes" or "may include", "comprises" or "may comprise," and the like, may specify the presence of stated features, numbers, operations, members, elements, and/or combinations thereof in various embodiments, but do not preclude the presence or addition of one or more other features, numbers, operations, members, elements, and/or combinations thereof in other various embodiments. In addition, herein, it is further noted that such a use of the term 'may' with respect to an example or embodiment, e.g., as to what an example or embodiment may include or implement, means that at least one example or embodiment exists where such a feature is included or implemented while all examples and embodiments are not limited thereto. Likewise, such expressions that indicate that a corresponding characteristic (e.g., a numerical value, function, operation, or component such as a part) may exist or may be present with respect to such stated features, numbers, operations, members, elements, and/or combinations thereof, does not exclude the presence of additional or alternate such corresponding characteristics, while again noting that the use of the term 'may' also means that embodiments are not limited to the existence or presence of a corresponding characteristic unless the disclosure makes clear otherwise.

In this specification, expressions such as "A and/or B", "at least one of A and B", or "one or more of A and B" may include all possible combinations of the items listed together. For example, "A and/or B", "at least one of A and B", or "one or more of A and B" means (1) including at least one A; (2) including at least one B, or (3) including both of at least one A and at least one B.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

In the drawings, an X direction may be defined as a first direction, an L direction, or a length direction. A Y direction may be defined as a second direction, a W direction, or a width direction. A Z direction may be defined as a third direction, a T direction, a thickness direction, or an optical axis direction. Additionally, other spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

Unless otherwise defined, all terms, including technical and scientific terms, used herein have the same meaning as commonly understood by one of ordinary skill in the art to which this disclosure pertains after an understanding of the disclosure of this application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Figure 1:
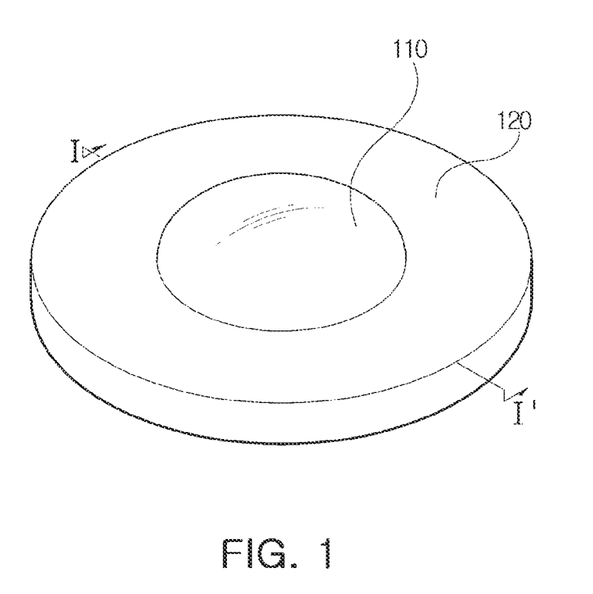
FIG. 1 is a perspective view schematically illustrating a lens, according to one or more embodiments.
Figure 2:
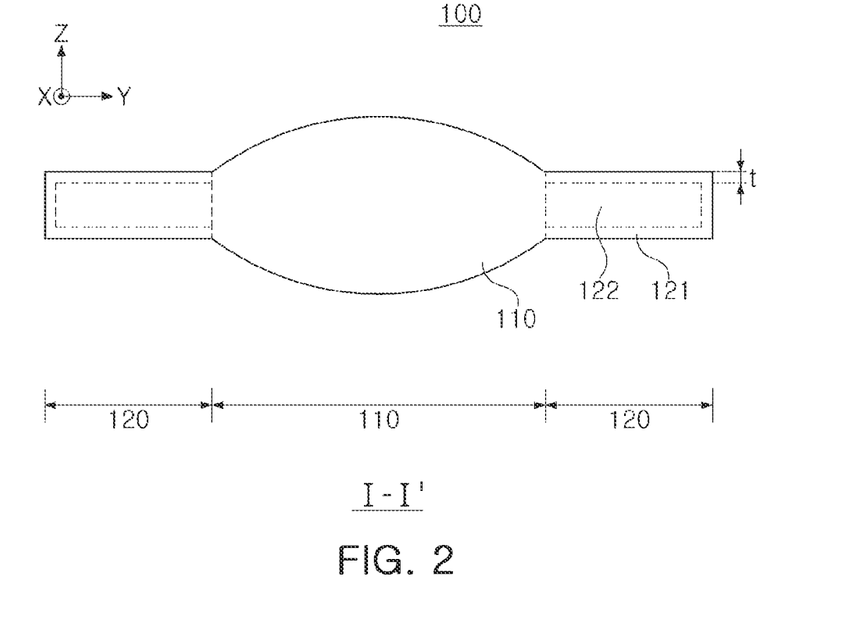
FIG. 2 is a cross-sectional view taken along line I-I' of FIG. 1, according to one or more embodiments.
Figure 3:
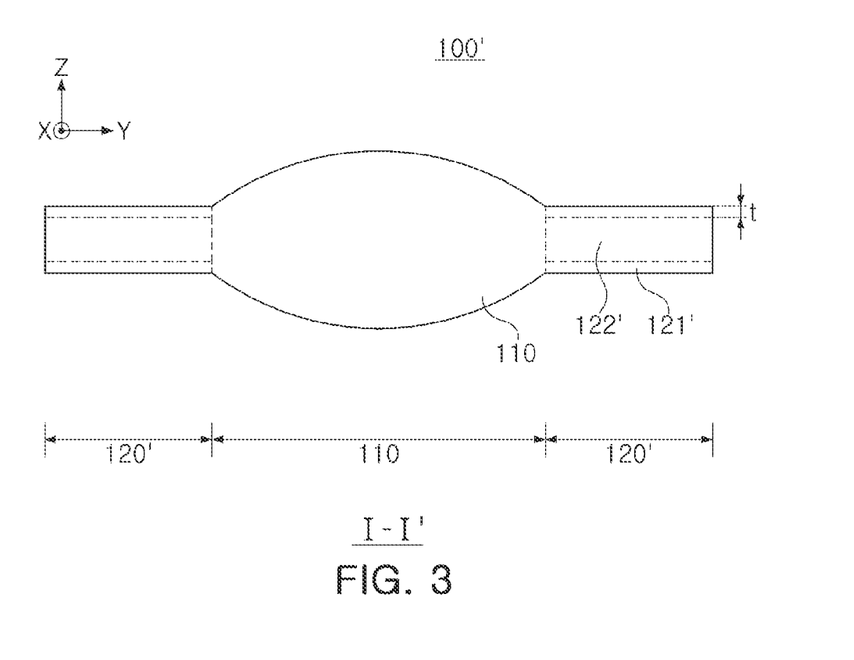
FIG. 3 is a cross-sectional view taken along line I-I' of FIG. 1, according to one or more embodiments.
Figure 4:
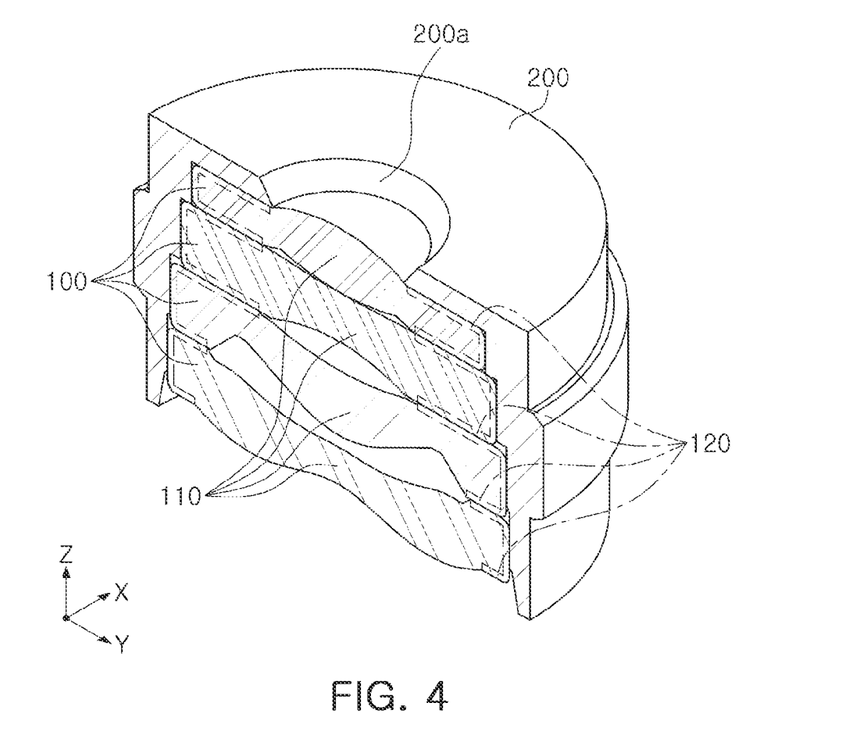
FIG. 4 is a perspective view schematically illustrating a lens assembly, according to one or more embodiments.

FIG. 1 is a perspective view schematically illustrating a lens, according to one or more embodiments. For example, FIG. 1 illustrates a lens 100 including an optical unit 110 and a rib portion 120 extending outwardly in a radial direction from the optical unit 110. The rib portion 120 may include a light transmission region 122 and a light blocking region 121. FIGS. 2 and 3 illustrate respective cross-sectional views taken along line I-I' of FIG. 1, according to various embodiments. Still further, FIG. 4 is a perspective view schematically illustrating a lens assembly, according to one or more embodiments. For example, a lens assembly according to one or more embodiments includes one or more lenses that may have one or more respective light blocking regions 121, according to various embodiments. Accordingly, hereinafter, example lenses according to various embodiments will be described in greater detail with reference to FIGS. 1 to 4, noting examples are not limited thereto.

Referring to FIGS. 1 to 4, as noted above, a lens 100 may include one or more rib portions 120, which may respectively include one or more of the light transmission regions 122 and one or more light blocking regions 121.

For example, each of a light blocking region 121 and a light transmission region 122 of an example rib portion 120 may be disposed portions of the rib portion 120, e.g., a light transmission region 122 may be further inside of the rib portion 120 than one or more light blocking regions 121 of the rib portion 120. Herein, as a non-limiting example, a certain "region" being disposed inside of a rib portion 120 may indicate that a maximum dimension of the corresponding region in the first direction, the second direction, and/or the third direction is smaller than a maximum dimension of the rib portion in the first direction, the second direction, and the third direction, and may indicate that outer boundaries of the corresponding region are all inside of the rib portion.

The shapes and/or types of the lens 100 are not limited, and while example embodiments may include a lens, lenses, or lens assembl(ies) in or for optical devices such as camera modules, examples are not limited thereto and example embodiments may include a lens, lenses, or lens assembl(ies) in or for other devices or systems, as non-limiting examples. The lens 100 may be a plastic resin lens including a resin component, and according to an example, the resin component may include a cyclic olefin compound. The lens 100 may be manufactured by molding a resin composition including a cyclic olefin compound into a predetermined shape, but the manufacturing method is not limited thereto.

In an example, the cyclic olefin compound may be one of, for example, a resin obtained by ring-opening (co)polymerizing a monomer having a norbornene skeleton and adding hydrogen thereto, a resin of a monomer alone having a norbornene skeleton or by addition (co)polymerization with α-olefin, and a resin obtained by addition (co)polymerizing an aromatic olefin monomer and adding hydrogen thereto, but is not limited thereto. Examples of the cyclic olefin compound include, but are not limited to, a norbornene-based polymer/copolymer, a benzocyclobutene-based polymer/copolymer, and the like.

Detailed examples of the monomer may include 2-norbornene, 5-methyl-2-norbornene, 5,5-dimethyl-2-norbornene, 5-ethyl-2-norbornene, 5-butyl-2-norbornene, 5-ethylidene-2-norbornene, 5-methoxycarbonyl-2-norbornene, 5-cyano-2-norbornene, 5-methyl-5-methoxycarbonyl-2-norbornene, 5-phenyl-2-norbornene, 5-phenyl-5-methyl-2-norbornene, dicyclopentadiene, 2,3-dihydrodicyclopentadiene, tetracyclo-3-dodecene, 8-methyl tetra cyclo-3-dodecene, 8-ethyltetra cyclo-3-dodecene, 8-hexyl tetracyclo-3-dodecene, 2,10-dimethyltetracyclo-3-dodecene, 5,10-dimethyltetracyclo-3-dodecene, 1,4:5,8-dimethano-1,2,3,4,4a,5,8,8a-2,3-cyclopentadieno naphthalene, 6-ethyl-1,4:5,8-dimethano-1,4,4a,5,6,7,8,8a-octahydronaphthalene, 1,4:5,10:6,9-trimethano-1,2,3,4,4a, 5,5a,6,9,9a,10,10a-dodecahydro-2,3-cyclopentadieno anthracene, adducts of cyclopentadiene and tetrahydroindene, and derivatives or substituents thereof, but are not limited thereto.

The lens 100 according to an example may include the optical unit 110 and the rib portion 120, such as illustrated in any of FIGS. 1-4, as non-limiting examples.

The optical unit 110 may be a region in which the optical performance of the lens 100 is exhibited, and for example, may be a region in which light reflected from an object (or a subject) is refracted, e.g., a portion or surface of the optical unit 110 of the lens 100 may have a positive or negative refractive power. The rib portion 120 may be a region for fixing the lens 100 to another configuration, for example, a lens barrel, another lens and/or a spacer, and the rib portion 120 may support the optical unit 110. The rib portion 120 may be a region extending outwardly in the radial direction of the optical unit 110. Herein, an outward "radial direction" may refer to a direction from a center of the optical unit 110 toward an outer circumferential surface of the lens 100, and may refer to a direction perpendicular to the optical axis direction. The rib portion 120 and the optical unit 110 may be distinguished by the position or function thereof, and may refer to divided regions within the same lens, for example. For example, the optical unit 110 and the rib portion 120 may constitute an integrated lens.

As noted above, the rib portion 120 of the lens 100 according to an example may include the light transmission region 122 and the light blocking region 121. The light transmission region 122 may indicate an area through which light may pass, and may indicate an area in which the light blocking region 121 is not formed. As non-limiting examples, the light transmission region 122 may indicate a region having an average transmittance of more than 80% for light in a range of 400 nm to 650 nm, for example, and the light blocking region 121 may indicate a region having an average transmittance of 20% or less for light in a range of 400 nm to 650 nm. The light transmission region 122 and the light blocking region 121 are terms used to distinguish an area dyed with a non-polar dye and an area not dyed with a non-polar dye, within the same lens, for example, and the light transmission region 122 and the light blocking region 121 may not have a clear boundary with each other. For example, depending on a depth and concentration of the non-polar dye from a surface of the rib region 120, there may be gradual decreases light transmissivity of the rib portion 120 in the light transmission region 122 closer to the light blocking region 121 as the concentration of the non-polar dye increases, and/or there may be gradual increases in light transmissivity of the rib portion 120 in the light blocking region 121 closer to the light transmission region 122 as the concentration of the non-polar dye decreases.

In an example, the light blocking region 121 of the lens 100 according to an example may be disposed inside of one surface of the rib portion 120 in the optical axis direction. In the present specification, the term "optical axis" may indicate a virtual line pointing to an optical path through which light passes, and may refer to an axis of symmetry when the curved surface of the lens has rotational symmetry. For example, referring to FIG. 2, assuming a virtual Z axis passing through the center of the lens, the Z axis may be an optical axis, and the Z axis direction may indicate an optical axis direction. As in this example, when the light blocking region 121 is disposed inside one surface of the rib portion 120 in the optical axis direction, the light blocking region 121 may be disposed inside of any one of both surfaces of the rib portion 120 in the Z axis direction. In an example, when the lens is dyed in only one Z axis direction, production efficiency may be increased.

In an example, the light blocking region 121 of the lens 100 according to an example may be disposed inside of both surfaces of the rib portion 120 in the optical axis direction. For example, the rib portion 120 of the lens 100 of the present example may have a structure in which the light blocking region 121, the light transmission region 122, and the light blocking region 121 are sequentially arranged in the Z-axis direction. In this case, since the light blocking region 121 is disposed inside of both surfaces of the rib portion 120 in the optical axis direction, the light transmittance of the light blocking region 121 of the rib portion 120 may be further reduced.

In another or additional example, the light blocking region 121 of the lens 100 may be disposed inside of the surface of the rib portion 120 in the radial direction, e.g., extending in an inward "radial direction" from an outer circumferential surface of the lens 100 toward the optical unit 110. The light blocking region 121 of the lens 100 of this example may be disposed on the radial surface of the rib portion 120, for example, in an outermost part of the rib portion 120 of the lens 100 in a direction perpendicular to the Z-axis direction. In this case, the light blocking region 121 may be disposed to include a surface of the rib portion 120, which is perpendicular to the optical axis, thereby blocking light incident in a direction other than the optical axis direction, and thus, may reduce or prevent lens flares or ghosting. For example, flare may be a generic term for a phenomenon in which image quality may deteriorate due to typical reflections other than an intended design path, and flares may be caused by various causes such as module housing, equipment reflection, and internal reflection.

In an example, the light blocking region 121 of the lens 100 may be disposed inside the rib portion 120 and include, e.g., in contact at or with, at least one surface of the rib portion 120. The light blocking region 121 being disposed in the rib portion 120 including the surface of the rib portion 120 may indicate that the light blocking region 121 is disposed on an end of the rib portion 120 in the X-axis, Y-axis and/or Z-axis directions, indicate that a spatial boundary of the rib portion 120 in the X-axis, Y-axis and/or Z-axis direction coincides with a spatial boundary of the light blocking region 121 in the X-axis, Y-axis and/or Z-axis direction, and indicate that the light blocking region 121 is exposed to the surface of the rib portion 120. The lens 100 according to an example may have an excellent balance since the rib portion 120 may be colored using a non-polar dye, for example, and thus an additional structure such as a coating film may not be disposed externally of the rib portion 120, as will be described in greater detail further below. The light blocking region 121 inside of one rib portion 120 of one lens 100 may also be disposed in contact with the surface of a rib portion 120 of another lens, e.g., in contact with the light blocking region 121 or the light transmission region 122 of the other lens.

In a non-limiting example, the average thickness of the light blocking region 121 of the lens 100 according to an example in the optical axis direction may be 15 µm or less. Referring to FIGS. 2 and 3, an average thickness t of the light blocking region 121 in the optical axis direction may be an average value of thicknesses measured in a direction perpendicular to the surface of the rib portion 120. For example, the average may be an arithmetic average of thicknesses measured at locations obtained by dividing an imaginary circle into 10 equal intervals, where the imaginary circle connects positions that are ½ of a maximum length of the rib portion 120 in the radial direction, for example.

In an example, the light blocking region 121 of the lens 100 may be a region colored using a light blocking dye. For example, as referred to herein, the term "dye" may indicate a colorant having solubility in a solvent, and may indicate a component distinct from a pigment that is not dissolved in a solvent and exists in a dispersed state. The light blocking region 121 may also be referred to as including a non-polar colorant.

Typically, a light blocking portion forming approach may include forming a coating film including a pigment on a surface of a non-optical unit portion of the lens. However, in such a typical approach, when forming the separate layer coating film, the surface of the lens may be damaged during the curing process of the coating film, and in a case in which the thickness of the coating film is not formed uniformly, a problem in which the weight balance of the lens may be disturbed may occur.

In the lens 100 according to one or more embodiments, by forming the light blocking region 121 in a method of coloring the rib portion 120 using a light blocking dye, potential damage to the lens may be significantly reduced compared to the damage from the typical coating film approach. In addition, since such a typical coating film attached to the outside of the lens may not be used, a lens having an excellent balance may be provided.

As noted above, the concentration of the light blocking dye included in the light blocking region 121 of the lens 100 according to an example may decrease as the distance from the surface of the rib portion 120 increases. The concentration of the light blocking dye may decrease as depths from the surface of the rib portion 120 increase, which may indicate that the concentration of the light blocking dye in a location spaced a predetermined distance apart from the surface of the rib portion 120 is lower than that of the surface. The distance spaced apart by a predetermined distance may be a vertical distance from the surface of the rib portion 120, and may indicate a depth corresponding to half of the average thickness of the light blocking region 121. The concentration of the light blocking dye may be a value measured on a position in which the thickness of the light blocking region 121 has been measured, and may be detected through Raman analysis, for example. As described later, the lens 100 according to an example may be colored by dissolving a predetermined dye in a predetermined solvent, and may have an excellent physical balance by forming the light blocking region 121, e.g., without using a separate external structure.

In an example, the light blocking dye applied to the lens 100 may be a non-polar dye. As used herein, "non-polar" may indicate that a relative positive charge (+) and/or negative charge (−) does not occur because charge separation does not occur, and may indicate a property that is not polar. In addition, herein, "polarity" may indicate a property of having a dipole or more multipole due to the bias of electric charges in a molecule, and indicate a property of having a relative positive charge (+) and/or negative charge (−). In the lens 100 according to an example, a non-polar dye may be used as a light blocking dye, and may thus have relatively high solubility in an example solvent to be described later, thereby effectively forming the light blocking region 121 of the lens.

The non-polar dye may include a non-polar functional group such as an alkyl group or a phenyl group, as a functional group. In this case, the non-polar dye may include only a non-polar functional group and not include a polar functional group. However, the non-polar dye may also include a portion of polar functional groups such as an amine group, a hydroxyl group, a carboxyl group, a ketone group, and an aldehyde group, and in this case, the number of polar functional groups included in the non-polar dye may be, for example, three or less in terms of having a non-polar property.

While types of the non-polar colorant are discussed as example, examples are not limited thereto. In an example, a colored or dark non-polar dye may be used. As a non-limiting example of the non-polar dye, at least one non-polar dye among a non-polar anthraquinone-based dye, a non-polar benzoquinone-based dye, a non-polar perylene-based dye, a non-polar phthalocyanine-based dye, a non-polar quinacridone-based pigment, a non-polar azo-based dye, and a non-polar diphenylmethane-based dye may be used, but examples are not limited thereto. In addition, as the non-polar dye, one type of non-polar dye may be used, but a combination of two or more types of non-polar dye may also be used.

In an example, the light blocking region 121 of the lens 100 may include an alkane having 1 to 16 carbon atoms. The alkane having 1 to 16 carbon atoms may be at least one or more selected from the group consisting of methane ($CH_4$), ethane ($C_2H_6$), propane ($C_3H_8$), butane ($C_4H_{10}$), pentane ($C_5H_{12}$), hexane ($C_6H_{14}$), heptanes ($C_7H_{16}$), octane ($C_8H_{18}$), nonane ($C_9H_{20}$), decane ($C_{10}H_{22}$), undecane ($C_{11}H_{24}$) and dodecane ($C_{12}H_{26}$), and may be two or more thereof.

The alkane having 1 to 16 carbon atoms may be distributed inside of the light blocking region 121 of the lens 100 according to an example, and may be included in the cross-linked structure formed by the above-described cyclic olefin compound. As used herein, the term "crosslinked structure" may indicate a structure formed by crosslinking between molecules, and "crosslinking" may refer to forming a reticular structure through chemical/physical bonding such as an ionic bond, a Van der Waals bond, hydrogen bonding, or a covalent bond between a molecule and a molecule. The presence or absence of the alkane having 1 to 16 carbon atoms may be confirmed using Time of Flight Secondary Ion Mass Spectrometer (ToF-SIMS), for example, TOF.SIMS M6 manufactured by ION-TOF, Germany, or the like.

In an example, the example alkane having the example 1 to 16 carbon atoms included in the light blocking region 121 of the lens 100 may be a solvent used to color the light blocking region 121. As described above, the lens 100 according to an example may include a cyclic olefin compound. When the lens 100 according to an example including the cyclic olefin compound is in contact with the solvent, the solvent may swell the surface of the lens. In this case, the non-polar dye described above may penetrate through the surface of the lens swollen by the solvent to form the light blocking region 121.

Typically, when coloring a lens to block light or control the path of light, the coloring is performed by dispersing a pigment in a dispersion medium such as water or the like. However, when this coloring of a lens using a dispersed pigment, it is often difficult to perform the coloring depending on the properties of the lens and the solvent, and there is a problem in that flares or ghosting occurs because the coloring degree is relatively low and the light is not effectively blocked. For example, when coloring a hydrophobic lens using a dispersed pigment in which the pigment is dispersed in a dispersion medium, coloring should be performed at high temperature for a long time or a carrier such as trichlorobenzene or dichlorobenzene should be added to the coloring solution. In this case, there is a problem with such typical coloring approaches in that the optical properties are deteriorated due to the deformation in the lens itself.

Rather, in one or more embodiments, meanwhile, a non-polar dye may be dissolved in an alkane having 1 to 16 carbon atoms and the light blocking region 121 of the lens 100 may be dyed using the same. In an example, even when dyeing is performed at a relatively low temperature for a short period of time, the coloring of the dye may have an excellent effect. In addition, since the light transmittance of the lens may be significantly reduced in the dyed area, compared to typical dispersed pigment approaches, flare or ghost phenomenon may be reduced or prevented due to the dyed area, and deformation of the lens or the like may be suppressed at the same time.

The light blocking region 121 of the lens 100 according to an example may be formed using a dyeing solution obtained by dissolving the above-described non-polar dye in an alkane having 1 to 16 carbon atoms, for example, and for example, the lens may be immersed in the dyeing solution or the dyeing may be performed by applying the dyeing solution, but the dyeing method is not limited thereto. The concentration of the non-polar dye to the solvent of the dyeing solution is not particularly limited, but may be 0.01 wt % or more and/or 10 wt % or less.

In an example, when the lens is dyed by immersing the lens in a dyeing solution, the dyeing may be performed at a temperature of 50° C. or less. The dyeing may be performed at 50° C. or less, 45° C. or less, 44° C. or less, 43° C. or less, 42° C. or less, 41° C. or less, or 40° C. or less, but the dyeing temperature is not limited thereto. When the lens is immersed in the solvent under such temperature conditions, the time required for coloring using the non-polar dye may be reduced without damaging the lens compared to typical pigment dispersion coloring approaches or typical painting or coating approaches, thereby having an advantageous effect on productivity. A lower limit of the temperature is not particularly limited, but may be, for example, 15° C. or higher, but is not limited thereto.

In addition, according to an example, a lens assembly 200 may be provided. FIG. 4 is a cross-sectional view schematically illustrating the lens assembly 200 according to an example.

Referring to FIG. 4, the lens assembly 200 according to an example may include a lens barrel including an inner space, and one or more lenses 100 stacked in the inner space of the lens barrel along an optical axis. The lens 100 may include an optical unit 110, and a rib portion 120 extending outwardly of the optical unit 110 in a radial direction of the optical unit 110. The rib portion 120 may include a light transmission region 122 and a light blocking region 121, and the light blocking region 121 may be disposed inside of the rib portion 120.

The one or more lenses 100 are stacked along the optical axis and disposed in the inner space of the lens barrel. In this case, the rib portion 120 of each of the plurality of lenses 100 may contact the rib portion 120 of the adjacent lens 100. In addition, each of the plurality of lenses 100 may be in contact with the inner circumferential surface of the lens barrel.

The number of lenses 100 included in the lens assembly 200 is not particularly limited, and optical properties such as refractive index of the plurality of respective lenses 100 may be the same or different from each other.

The lens barrel may have a hollow cylindrical shape, and a lens hole 200a through which light may be transmitted may be formed by penetrating through one surface of the lens barrel.

The description of the light blocking region 121 included in the above description is also applicable to one or more respective light blocking regions 121 of respective rib portions 120 of the one or more lenses 100 of the lens assembly 200.

Hereinafter, for explanatory purposes, and according to various embodiments, non-limiting experimental Examples and Comparative Examples will be described in greater detail, noting that the spirit of the present disclosure is not limited to these examples.

In an Example 1, according to one or more embodiments, a Cyclo Olefin Copolymer resin lens was used as a lens, an anthraquinone-based and azo-based dye mixture was used as a non-polar dye, and heptanes were used as a solvent. A dye solution was prepared by dissolving the dye in the solvent at a concentration of 1 to 10% by weight or less, for example, 10% by weight, and then, the lens was immersed in the dyeing solution, thereby forming a light blocking region. The dyeing temperature of the dyeing solution is a temperature of room temperature to 50° C. or less, for example, 50° C., and the light blocking region was formed by immersing the lens for a time of about 600 seconds, and then, the lens having the light blocking region was prepared by performing washing and drying.

In an Example 2, according to one or more embodiments, a lens having a light blocking region was manufactured in the same manner as in Example 1, except that decane was used as the solvent.

In a Comparative Example 1, a cyclo olefin copolymer resin lens in which a separate light blocking region is not formed was used.

In a Comparative Example 2, a lens having a light blocking region was manufactured in the same manner as in Example 1, except that tetrahydrofuran (THF) was used as a solvent.

In a Comparative Example 3, a lens having a light blocking region was manufactured in the same manner as in Example 1, except that toluene was used as a solvent.

Figure 5:
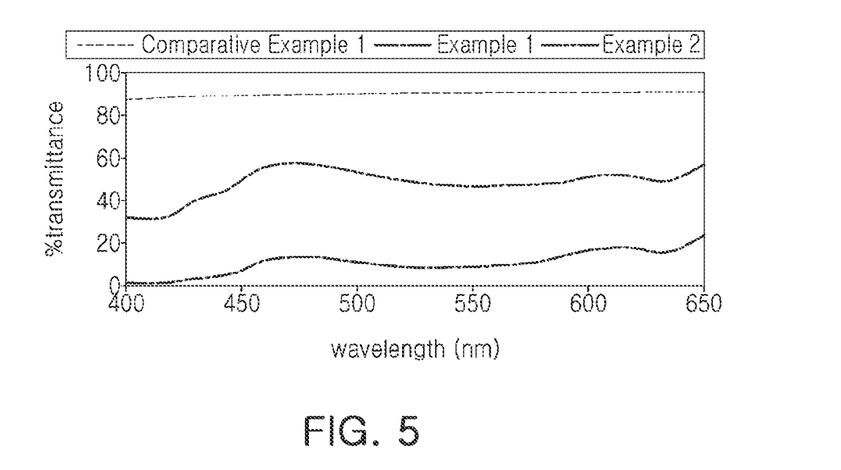
FIG. 5 is a graph illustrating transmittance for wavelengths in non-limiting example embodiments and a comparative example.

FIG. 5 is a graph illustrating the light transmittance of the lenses according to Examples 1 and 2 and Comparative Example 1. Referring to FIG. 5, it can be seen that Comparative Example 1 exhibits very high light transmittance, compared to Example 1 in which a non-polar dye is dissolved in a non-polar solvent. Likewise, referring to FIG. 5, it can be seen that Comparative Example 1 also exhibits high light transmittance, compared to Example 2 in which a non-polar dye is dissolved in another non-polar solvent. Therefore, it can be confirmed that the lens according to one or more embodiments may an have excellent light blocking rate.

Figure 6:
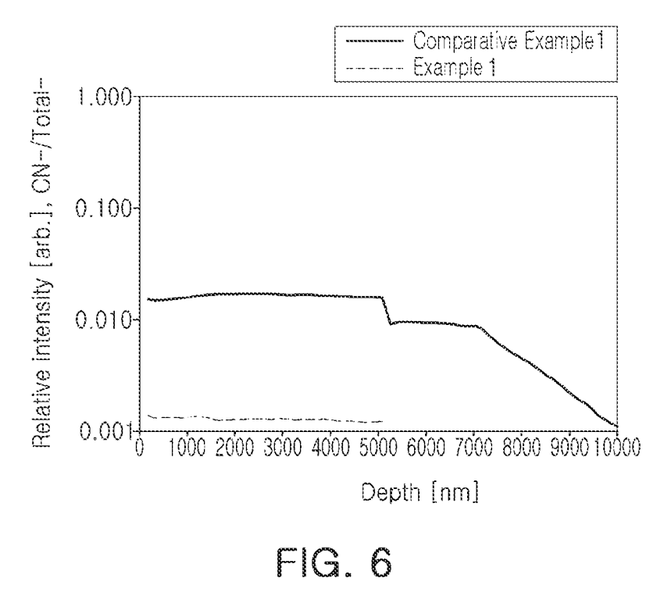
FIG. 6 is a graph illustrating coloring thicknesses of lens ribs of a non-limiting example embodiment and a comparative example.

FIG. 6 is a graph provided by analyzing the content of the coloring dye according to the depth of the rib portion according to Example 1 and Comparative Example 1. Referring to FIG. 6, in the case of Example 1, it can be confirmed that the dye is detected at a concentration of a certain level or more up to a depth of about 5000 nm or more, and thereafter, from a depth of about 7000 nm or more, as the concentration of the dye is reduced further away from the surface of the rib portion. Therefore, it can be confirmed that the light blocking region of the lens according to one or more embodiments may have a sufficient depth.

Figure 7:
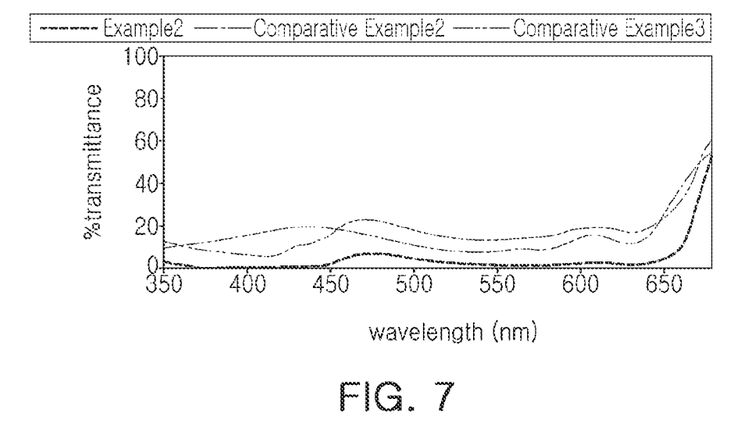
FIG. 7 is a graph illustrating light transmittance according to wavelengths of a non-limiting example embodiment and comparative examples, in which the respective rib portions are colored using different solvents.

FIG. 7 is a graph illustrating the light transmittance according to the wavelength of Example 2 and Comparative Examples 2 and 3, in which the rib portions were colored using different solvents. Referring to FIG. 7, when the light blocking region of the rib portion is dyed using alkane as a solvent, it can be seen that the transmittance is uniformly low in the entire range of 350 nm to 650 nm, and the transmittance is less than 10% in all sections. On the other hand, in Comparative Examples 2 and 3, the transmittance changes depending on the wavelength band, and it can be seen that the transmittance is higher than 20% in the case of a relatively high transmittance. Therefore, in one or more embodiments, when using an alkane to color the light blocking region of the lens including the cyclic olefin compound, it can be confirmed that the alkane swells the surface of the lens and the non-polar dye effectively forms the light blocking region.

As set forth above, according to an example, a flares or ghosting of the lens may be reduced or prevented compared to typical light blocking/reduction approaches.

Accordingly, in a lens device or system, such as including a lens, two or more lenses, or a lens assembly with such one or more lenses, in which at least one light blocking region is formed inside of a rib portion of at least one lens, an efficiency of a production process of lenses and lens assemblies may be improved compared to typical approaches.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens device comprising:
    a lens including:
        an optical unit; and
        a rib portion extending outwardly of the optical unit in a radial direction,
    wherein the rib portion includes a light transmission region and a light blocking region, and
    wherein the light blocking region is disposed inside of the rib portion and comprises a non-polar colorant.

2. The lens device of claim 1, wherein the light blocking region extends inside the rib portion from one surface of the rib portion in an optical axis direction.

3. The lens device of claim 1, wherein the light blocking region extends inside the rib portion from both surfaces of the rib portion in an optical axis direction.

4. The lens device of claim 1, wherein the light blocking region extends inside the rib portion from a surface of the rib portion toward an optical axis of the lens.

5. The lens device of claim 1, wherein the light blocking region is disposed inside the rib portion at at least one surface of the rib portion.

6. The lens device of claim 1, wherein an average thickness of the light blocking region in an optical axis direction is 15 µm or less.

7. The lens device of claim 1, wherein the light blocking region has an average transmittance of 20% or less for light having a wavelength of 400 nm to 650 nm.

8. The lens device of claim 1, wherein the light blocking region comprises an alkane having 1 to 16 carbon atoms.

9. The lens device of claim 1,
wherein the colorant is a light blocking dye, and
wherein a concentration of the light blocking dye decreases as a distance from a surface of the rib portion increases toward the light transmission region.

10. The lens device of claim 1, wherein at least the rib portion of the lens comprises a cyclic olefin compound.

11. The lens device of claim 1, wherein the lens device further comprises:
another lens adjacent to the lens, the other lens including:
another optical unit; and
another rib portion extending outwardly of the other optical unit in a corresponding radial direction,
wherein the other rib portion includes another light transmission region.

12. The lens device of claim 11,
wherein the other rib portion includes another light blocking region that comprises another non-polar colorant,
wherein the other light blocking region is disposed inside of the other rib portion, and
wherein the colorant is same or different from the other colorant.

13. The lens device of claim 12,
wherein the light blocking region includes an entire outer circumference edge of the lens and/or the other light blocking region includes an entire outer circumference edge of the other lens.

14. The lens device of claim 12, wherein the lens device is a lens assembly and further comprises a lens barrel including the lens and the other lens.

15. The lens device of claim 14,
wherein the light blocking region is adjacent to the other light blocking region.

16. A lens comprising:
an optical unit; and
a rib portion extending outwardly of the optical unit in a radial direction,
wherein the optical unit and the rib portion comprise a cyclic olefin compound,
wherein the rib portion includes a light transmission region and a light blocking region, and
wherein the light blocking region is disposed inside of the rib portion and includes a non-polar colorant for reducing light transmissivity.

17. A lens device comprising:
a lens assembly, including:
a lens barrel including an internal space; and
one or more lenses stacked in the internal space of the lens barrel along an optical axis,
wherein each of the one or more lenses include a respective optical unit and a respective rib portion extending outwardly of the respective optical unit in respective radial directions of the stacked one or more lenses,
wherein one or more of the respective rib portions includes a respective light transmission region and a respective light blocking region, and
wherein the respective light blocking regions are disposed inside of the one or more respective rib portions and each comprise respective non-polar colorants.

18. The lens assembly of claim 17, wherein a corresponding light blocking region, of the respective light blocking regions of the one or more respective rib portions, of at least one of the one or more lenses extends inside a corresponding rib portion from one surface or both surfaces of the corresponding rib portion in an optical axis direction.

19. The lens assembly of claim 17, wherein a corresponding light blocking region, of the respective light blocking regions of the one or more respective rib portions, of at least one of the one or more lenses extends inside a corresponding rib portion from a radially outward surface of the corresponding rib portion toward an optical axis of the at least one lens.

20. The lens assembly of claim 17, wherein a corresponding light blocking region, of the respective light blocking regions of the one or more respective rib portions, of at least one of the one or more lenses is disposed inside a corresponding rib portion at at least one surface of the corresponding rib portion.

* * * * *